United States Patent
Liao et al.

(10) Patent No.: US 11,150,399 B2
(45) Date of Patent: Oct. 19, 2021

(54) BACKLIGHT MODULE AND DISPLAY APPARATUS

(71) Applicant: Coretronic Corporation, Hsin-Chu (TW)

(72) Inventors: Chun-Chien Liao, Hsin-Chu (TW); Ping-Yen Chen, Hsin-Chu (TW); Yung-Lung Liu, Hsin-Chu (TW); Chun-Wei Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/124,503

(22) Filed: Dec. 17, 2020

(65) Prior Publication Data

US 2021/0191027 A1 Jun. 24, 2021

(30) Foreign Application Priority Data

Dec. 24, 2019 (CN) .......................... 201922343014.4

(51) Int. Cl.
*G02B 6/00* (2006.01)
*F21V 8/00* (2006.01)

(52) U.S. Cl.
CPC ......... *G02B 6/0051* (2013.01); *G02B 6/0016* (2013.01); *G02B 6/0053* (2013.01); *G02B 6/0068* (2013.01)

(58) Field of Classification Search
CPC .. G02B 6/0016; G02B 6/0035; G02B 6/0036; G02B 6/0051; G02B 6/0053; G02B 6/0068; G02B 6/0073; G02B 6/0075; G02B 6/0076
See application file for complete search history.

(56) References Cited

U.S. PATENT DOCUMENTS

| 2008/0043490 | A1* | 2/2008 | Coleman | G02B 6/0036 362/623 |
| 2009/0067156 | A1* | 3/2009 | Bonnett | G02B 6/0076 362/97.2 |
| 2017/0153383 | A1* | 6/2017 | Lee | G02B 6/0068 |
| 2019/0146137 | A1* | 5/2019 | Wang | G02B 6/0036 362/613 |

FOREIGN PATENT DOCUMENTS

| CN | 1987606 | 4/2010 |
| TW | M579292 | 6/2019 |

* cited by examiner

*Primary Examiner* — Y M. Quach Lee
(74) *Attorney, Agent, or Firm* — JCIPRNET

(57) ABSTRACT

A backlight module includes a light guide member, a first light source, a second light source, a plurality of first optical microstructures, and a plurality of second optical microstructures. The light guide member has a first light incident surface and an adjacent second light incident surface. The first light source is disposed at one side of the first light incident surface and is configured to generate a first light beam. The second light source is disposed at one side of the second light incident surface and is configured to generate a second light beam. The first and the second optical microstructures are disposed at the light guide member and are configured to reflect the first and the second light beams. The reflected first light beam has a first light emitting angle range without a normal viewing angle range. A display apparatus using the backlight module is also provided.

10 Claims, 13 Drawing Sheets

BACKLIGHT MODULE AND DISPLAY APPARATUS

CROSS-REFERENCE TO RELATED APPLICATION

This application claims the priority benefit of China application serial no. 201922343014.4, filed on Dec. 24, 2019. The entirety of the above-mentioned patent application is hereby incorporated by reference herein and made a part of this specification.

BACKGROUND OF THE INVENTION

Field of the Invention

The invention relates to a viewing angle control technology, and in particular, to a backlight module and a display apparatus.

Description of Related Art

Generally, a display apparatus has a wide viewing angle, so that a plurality of viewers may view a screen together. However, during browsing of a private webpage and confidential information or entering of passwords in public, etc., the display apparatus has a wide viewing angle is likely to cause the confidential information to be viewed by others, resulting in leaking of the confidential information. In order to achieve an anti-peep effect, a light control film (LCF) is generally placed in front of a display panel to filter out the light with large-angle. On the contrary, when there is no anti-peep need, the light control film in front of the display panel may be manually removed. In other words, although such a light control film has an anti-peep effect, operation convenience thereof is to be improved. Therefore, it is an important issue for related manufacturer to develop a display apparatus exhibiting convenient viewing angle switch effect and a favorable anti-peep effect.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a backlight module with an adjustable light-emitting light type.

The invention provides a display apparatus exhibiting favorable anti-peep performance.

Other objectives and advantages of the invention may be further understood from the technical features disclosed in the invention.

In order to achieve some or all of the above or other purposes, an embodiment of the invention provides a backlight module. The backlight module includes a light guide member, a first light source, a second light source, a plurality of first optical microstructures, and a plurality of second optical microstructures. The light guide member includes a first light incident surface and a second light incident surface, and the first light incident surface and the second light incident surface are adjacent to each other. The first light source is disposed at one side of the first light incident surface of the light guide member and is configured to generate a first light beam. The second light source is disposed at one side of the second light incident surface of the light guide member and is configured to generate a second light beam. The first optical microstructures are disposed at the light guide member and each has a first light receiving surface facing the first light source. The first light receiving surfaces are configured to reflect the first light beam. The reflected first light beam has a first light emitting angle range. The first light emitting angle range does not include a normal viewing angle range. The second optical microstructures are disposed at the light guide member and each has a second light receiving surface facing the second light source. The second light receiving surfaces are configured to reflect the second light beam. The reflected second light beam has a second light emitting angle range.

In order to achieve some or all of the above or other purposes, an embodiment of the invention provides a display apparatus. The display apparatus includes a display panel and a backlight module. The backlight module is overlapped with the display panel and includes a light guide member, a first light source, a second light source, a plurality of first optical microstructures, and a plurality of second optical microstructures. The light guide member includes a first light incident surface and a second light incident surface, and the first light incident surface and the second light incident surface are adjacent to each other. The first light source is disposed at one side of the first light incident surface of the light guide member and is configured to generate a first light beam. The second light source is disposed at one side of the second light incident surface of the light guide member and is configured to generate a second light beam. The plurality of first optical microstructures are disposed at the light guide member and each has a first light receiving surface facing the first light source. The first light receiving surfaces are configured to reflect the first light beam. The reflected first light beam has a first light emitting angle range. The first light emitting angle range does not include a normal viewing angle range. The plurality of second optical microstructures are disposed at the light guide member and each has a second light receiving surface facing the second light source. The second light receiving surfaces are configured to reflect the second light beam. The reflected second light beam has a second light emitting angle range.

Based on the above, in the backlight module and the display apparatus according to an embodiment of the invention, the first light source and the second light source are provided at two adjacent light incident sides of the light guide member, respectively. The first light beam emitted by the first light source and the second light beam emitted by the second light source have the first light emitting angle range and the second light emitting angle range respectively after being reflected by the first optical microstructures and the second optical microstructures on the light guide member. The first light emitting angle range is less than the second light emitting angle range. Through switching between turning on and off of the first light source and the second light source, the backlight module may feature an adjustable light-emitting light type. In this way, the display apparatus can be switched between an anti-peep mode and a sharing mode, and convenience of operation of the display apparatus is therefore improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
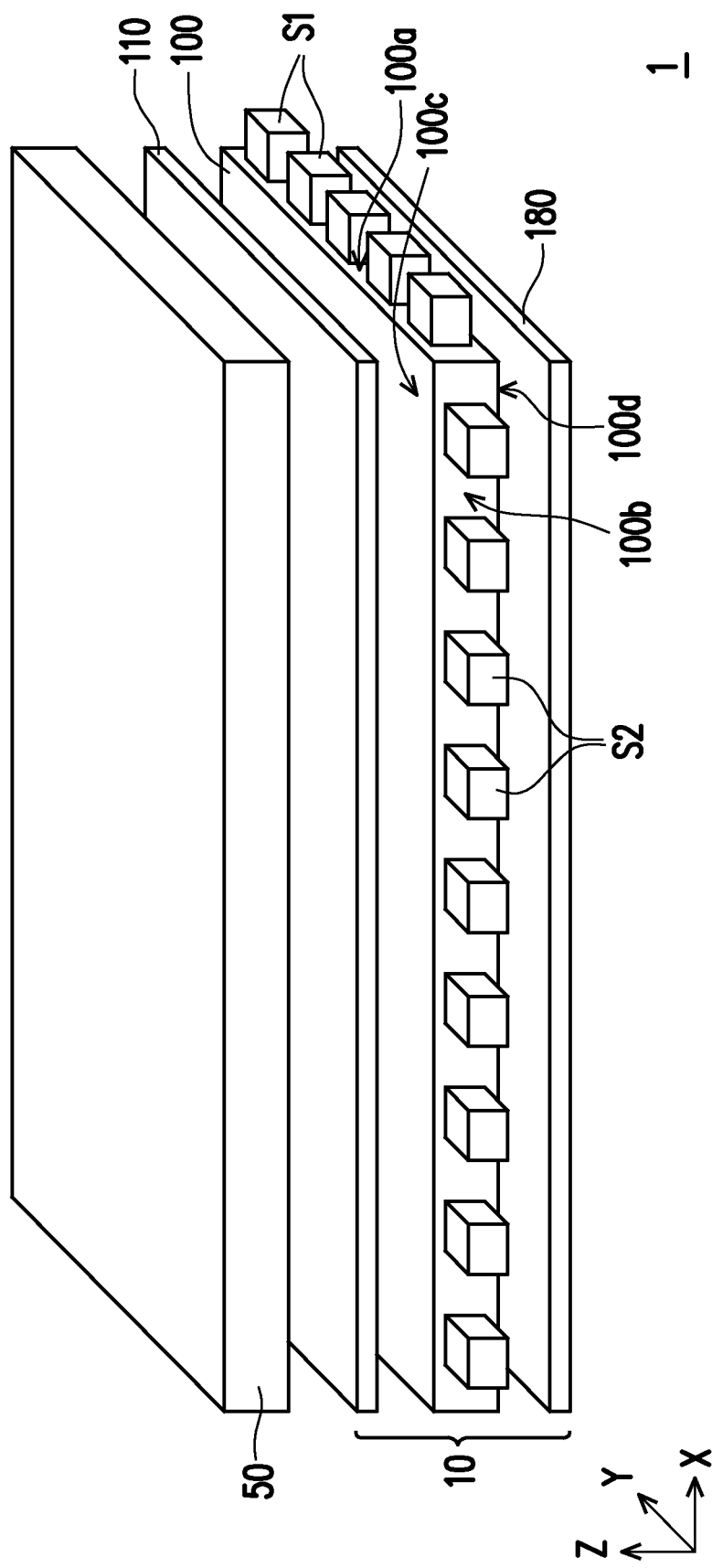
FIG. 1 is a schematic view of a display apparatus according to a first embodiment of the invention.
Figure 2:
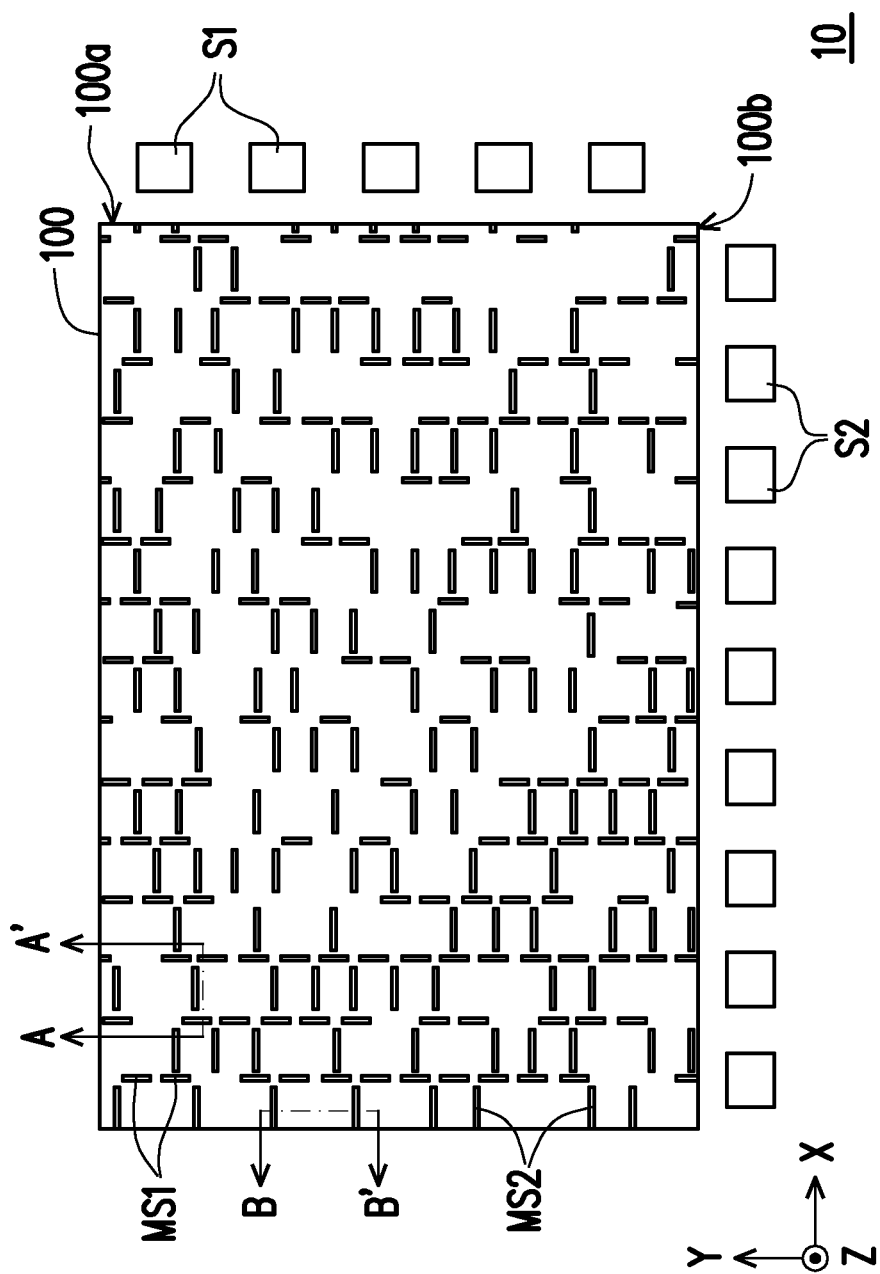
FIG. 2 is a schematic top view of a backlight module in FIG. 1.
Figure 3A:
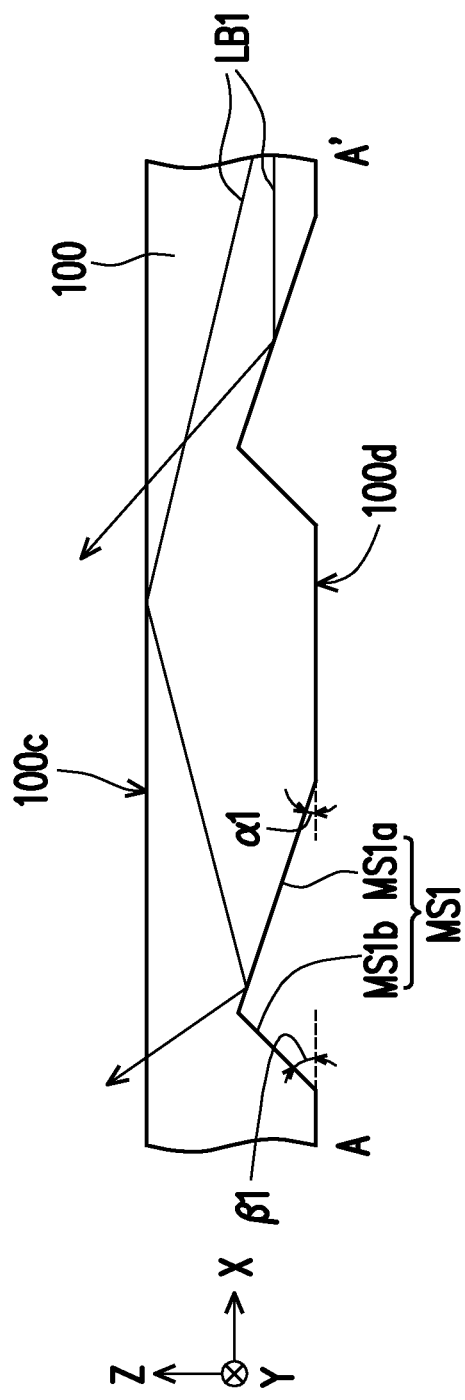
FIG. 3A and FIG. 3B are schematic cross-sectional views of a first optical microstructure and a second optical microstructure in FIG. 2, respectively.
Figure 3B:
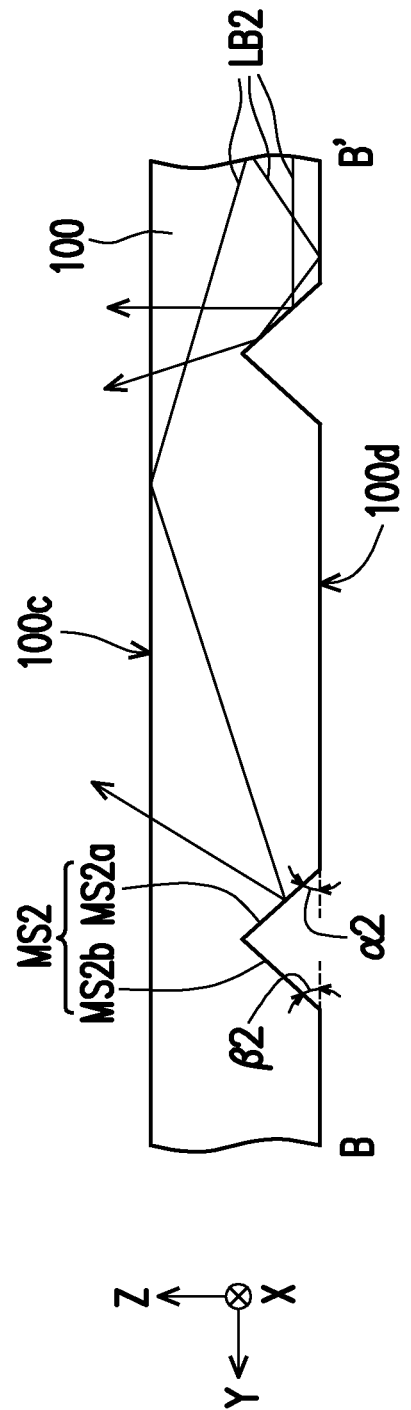
Figure 4:
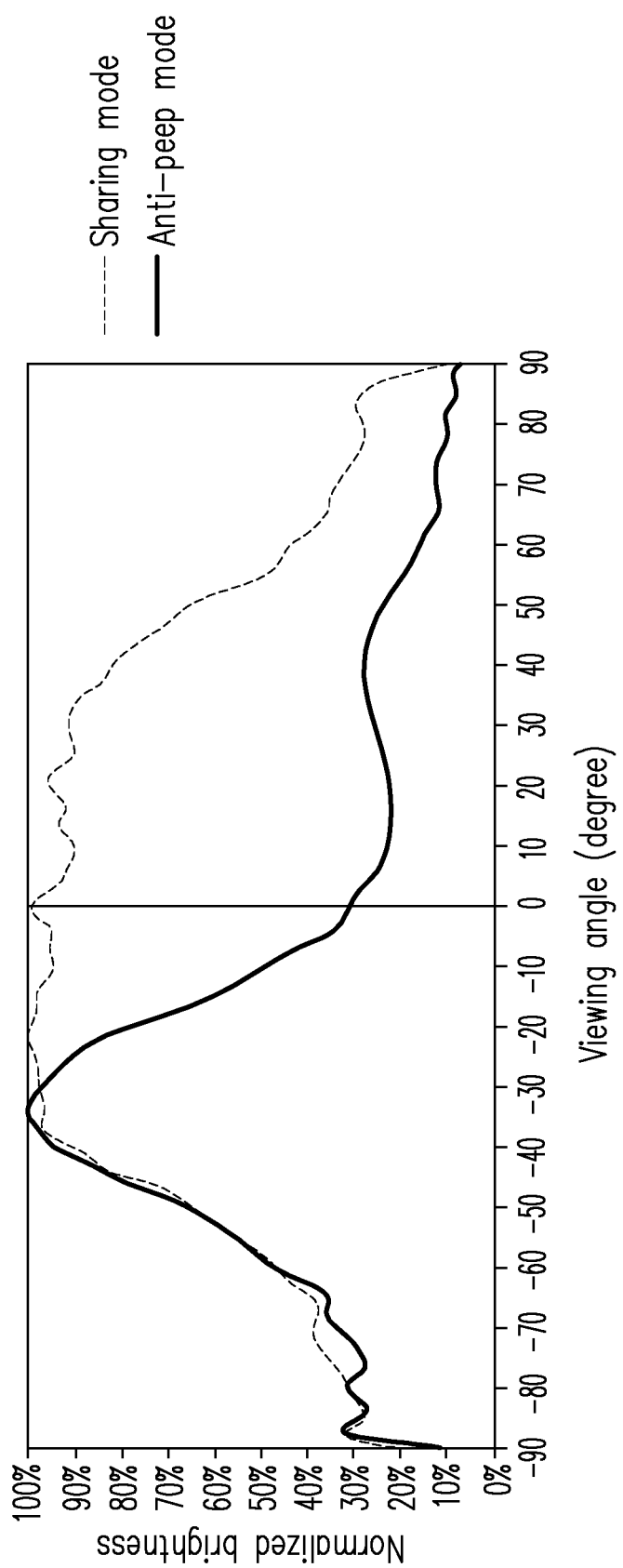
FIG. 4 is a graph of a viewing angle versus normalized brightness of the backlight module of FIG. 1 in different modes.

FIG. 1 is a schematic view of a display apparatus according to a first embodiment of the invention. FIG. 2 is a schematic top view of a backlight module in FIG. 1. FIG. 3A and FIG. 3B are schematic cross-sectional views of a first optical microstructure and a second optical microstructure in FIG. 2, respectively. FIG. 4 is a graph of a viewing angle versus normalized brightness of the backlight module of FIG. 1 in different modes. In particular, FIG. 3A and FIG. 3B correspond to a section line A-A' and a section line B-B' in FIG. 2, respectively. For clarity, FIG. 2 omits an optical film 110 and a light absorbing sheet 180 in FIG. 1.

Referring to FIG. 1, FIG. 2, FIG. 3A, and FIG. 3B, a display apparatus 1 includes a backlight module 10 and a display panel 50. The display panel 50 is overlapped with the backlight module 10. In the embodiment, the display panel 50 is, for example, a liquid crystal display panel (LCD panel), but the invention is not limited thereto. In other embodiments, the display panel 50 may also be an electrophoretic display panel (EPD panel) or other non-self-luminous display panel. In particular, the display apparatus 1 in the embodiment has an anti-peep function to which the display apparatus may be switched. In other words, the display apparatus 1 is operable in an anti-peep mode or a sharing mode. More specifically, the backlight module 10 in the embodiment is configured to switch between the anti-peep mode and the sharing mode, so that the display apparatus 1 has an anti-peep function to which the display apparatus may be switched.

The backlight module 10 includes a light guide member 100, a first light source S1, and a second light source S2. The light guide member 100 has a first light incident surface 100a and a second light incident surface 100b adjacent to each other. The first light source S1 is disposed at one side of the first light incident surface 100a of the light guide member 100 and is configured to generate a first light beam LB1 (shown in FIG. 3A). The second light source S2 is disposed at one side of the second light incident surface 100b of the light guide member 100 and is configured to generate a second light beam LB2 (shown in FIG. 3B). In the embodiment, the light guide member 100 is, for example, a light guide plate, but the invention is not limited thereto. According to other embodiments, the light guide member 100 may also be two light guide plates overlapped with each other. It should be noted that, in the embodiment, a number of the first light sources S1 is exemplified as five and a number of the second light sources S2 is exemplified as nine for exemplary description, and the invention is limited to the content of the drawings. In other embodiments, the number of configured light sources may be adjusted according to the optical design of the backlight module.

Accordingly, the light guide member 100 also has a light emitting surface 100c and a bottom surface 100d opposite to each other. The first light incident surface 100a and the second light incident surface 100b are connected to two adjacent sides of the bottom surface 100d, respectively, and are connected between the light emitting surface 100c and the bottom surface 100d, respectively. The backlight module 10 further includes a plurality of first optical microstructures MS1 (shown in FIG. 2 and FIG. 3A) and a plurality of second optical microstructures MS2 (shown in FIG. 2 and FIG. 3B). In the embodiment, the first optical microstructures MS1 and the second optical microstructures MS2 are, for example, recessed structures disposed on the bottom surface 100d of the light guide member 100, but the invention is not limited thereto. In other embodiments, the first optical microstructure and the second optical microstructure may also be protruding structures on the bottom surface 100d of the light guide member 100.

In particular, referring to FIG. 2, FIG. 3A and FIG. 3B, the first optical microstructure MS1 has a first light receiving surface MS1a facing the first light source S1. The second optical microstructure MS2 has a second light receiving surface MS2a facing the second light source S2. The first light receiving surface MS1a of the first optical microstructure MS1 is configured to reflect the first light beam LB1 from the first light source S1 and transmitted in the light guide member 100, and guide the first light beam LB1 to a direction toward the light emitting surface 100c. The second light receiving surface MS2a of the second optical microstructure MS2 is configured to reflect the second light beam LB2 from the second light source S2 and transmitted in the light guide member 100, and guide the second light beam LB2 to a direction toward the light emitting surface 100c. In the embodiment, there a first angle $\alpha 1$ is provided between the first light receiving surface MS1a and the bottom surface 100d of the light guide member 100, and a second angle $\alpha 2$ is provided between the second light receiving surface MS2a and the bottom surface 100d of the light guide member 100. The first angle $\alpha 1$ is less than the second angle $\alpha 2$. In an exemplary embodiment, the first angle $\alpha 1$ may be greater than 10 degrees and less than 30 degrees, and the second angle $\alpha 2$ may be greater than 45 degrees and less than 60 degrees, but the invention is not limited thereto. In other special embodiments, the first angle $\alpha 1$ of the first optical microstructure MS1 may also be equal to the second angle $\alpha 2$ of the second optical microstructure MS2.

Referring to FIG. 4, when the display apparatus 1 operates in the anti-peep mode, the first light source S1 of the backlight module 10 is turned on and the second light source S2 is turned off. In this case, the first light beam LB1 transmitted in the light guide member 100 has a first light emitting angle range (for example, horizontal viewing angle, −X axis direction to X axis direction) after being reflected by the first light receiving surface MS1a of the first optical microstructure MS1. The first light emitting angle range does not include a normal viewing angle range. For example, in the embodiment, the first light emitting angle range is, for example, −20 degrees to −50 degrees, and the normal viewing angle range is, for example, −10 degrees to 10 degrees, but the invention is not limited thereto. It should be noted that the light emitting angle range of the backlight module 10 is defined by a viewing angle range in which normalized brightness of a light beam (for example, the first light beam LB1 or the second light beam LB2) is greater than or equal to 75%, but the invention is not limited thereto. In other embodiments, a lower limit of the normalized brightness used to define the light emitting angle range may also be adjusted according to optical specifications of the anti-peep display apparatus.

The first light emitting angle range is deviated toward one side of the normal viewing angle (for example, a leftward viewing angle range in FIG. 4), so that persons located directly ahead the display apparatus 1 and at a right front location of the display apparatus 1 cannot clearly see an image (for example, confidential information) on the display panel 50, and only a person at a left front location of the display apparatus 1 can clearly see the image. In other words, according to the backlight module 10 in the embodiment, the display apparatus 1 may have a one-side anti-peep function.

When the display apparatus 1 operates in the sharing mode, the second light source S2 of the backlight module 10 is turned on and the first light source S1 is turned off. In this case, the second light beam LB2 transmitted in the light guide member 100 has a second light emitting range after being reflected by the second light receiving surface MS2a of the second optical microstructure MS2. The second light emitting angle range is greater than the first light emitting angle range, and may include a normal viewing angle range. For example, in the embodiment, the second light emitting angle range is, for example, −45 degrees to 45 degrees, and the normal viewing angle range is, for example, −10 degrees to 10 degrees, but the invention is not limited thereto. In other words, persons located directly ahead of the display apparatus 1 and at a left front location and a right front location of the display apparatus can clearly see a to-be-shared imaged.

It should be noted that, through switching between turning on and off of the first light source S1 and the second light source S2, the backlight module 10 can exhibit an adjustable light-emitting light type. In this way, the display apparatus 1 can be switched between the anti-peep mode and the sharing mode, and convenience of operation of the display apparatus 1 is therefore improved.

In the embodiment, a normal projection of the first optical microstructure MS1 on the light emitting surface 100c extends substantially in a direction (that is, a direction Y) perpendicular to the second light incident surface 100b, and a normal projection of the second optical microstructure MS2 on the light emitting surface 100c extends substantially in a direction (that is, a direction X) perpendicular to the first light incident surface 100a. In other words, the normal projection of the optical microstructure on the light emitting surface 100c in the embodiment has a long strip shape. In an embodiment of the invention, the first optical microstructure MS1 may be designed in such a way that a ratio of an amount of the reflected second light beam LB2 to an amount of the reflected first light beam LB1 can be less than 1/10. The second optical microstructure MS2 may be designed in such a way that a ratio of an amount of the reflected first light beam LB1 to an amount of the reflected second light beam LB2 can be less than 1/10. However, the invention is not limited thereto.

For example, a ratio of a length of the first optical microstructure MS1 in a direction (that is, the direction Y) parallel to the first light incident surface 100a and a width of the first optical microstructure MS1 in a direction (that is, the direction X) perpendicular to the first light incident surface 100a may be greater than 10 to reduce a probability that the second light beam LB2 is reflected by the first optical microstructure MS1. Similarly, a length of the second optical microstructure MS2 in a direction (that is, the direction X) parallel to the second light incident surface 100b and a width of the second optical microstructure MS2 in a direction (that is, the direction Y) perpendicular to the second light incident surface 100b may be greater than 10 to reduce a probability that the first light beam LB1 is reflected by the second optical microstructure MS2. However, the invention is not limited thereto. In other embodiments, the normal projection of the optical microstructure on the light emitting surface 100c may also be adjusted to a meniscus shape, to reduce the probability that the first light beam LB1 is reflected by the second optical microstructure MS2 (or the probability that the second light beam LB2 is reflected by the first optical microstructure MS1).

It should be noted that the arrangement and the distribution of the first optical microstructure MS1 and the second optical microstructure MS2 shown in FIG. 2 is merely for illustrative purposes, and does not mean that the invention is limited thereto. In other embodiments, a distribution density of the optical microstructures may be adjusted according to the optical specifications of the backlight module, for example, the distribution density of the first optical microstructure MS1 increases along a direction away from the first light source S1 and/or the distribution density of the second optical microstructure MS2 increases along a direction away from the second light source S2, so as to meet specification requirements of light uniformity.

In addition, referring to FIG. 3A and FIG. 3B, the first optical microstructure MS1 further includes a first shady surface MS1b facing away from the first light source S1. The first shady surface MS1b is connected between the bottom surface 100d and the first light receiving surface MS1a of the light guide member 100. The second optical microstructure MS2 further includes a second shady surface MS2b facing away from the second light source S2. The second shady surface MS2b is connected between the bottom surface 100d and the second light receiving surface MS2a of the light guide member 100. In the embodiment, a third angle β1 is provided between the first shady surface MS1b and the bottom surface 100d of the light guide member 100 and a fourth angle β2 is provided between the second shady surface MS2b and the bottom surface 100d of the light guide member 100. The third angle β1 is unequal to the fourth angle β2, but the invention is not limited thereto. In other embodiments, the third angle β1 may also be equal to the fourth angle β2.

It is worth mentioning that the first angle α1 of the first optical microstructure MS1 is less than the third angle β1 and the second angle α2 of the second optical microstructure MS2 is less than the fourth angle β2, so that a scattered light generated when a light beam is being transmitted in the light guide member 100 can be effectively prevented from emitting from the light emitting surface 100c after being reflected by the first optical microstructure MS1 and the second optical microstructure MS2.

Referring to FIG. 1, in the embodiment, the backlight module 10 may further include an optical film 110. The optical film 110 is overlapped with the light emitting surface 100c of the light guide member 100 and is located between the light guide member 100 and the display panel 50. The optical film 110 is, for example, a diffuser, but the invention is not limited thereto. In other embodiments, the optical film 110 may also be a prism sheet, a brightness enhancement film (BEF), or an inverse prism sheet, etc. It should be noted that, in the embodiment, that there is one optical film is used as an example for exemplary description, which does not mean that the invention is limited to the disclosure in the drawings. In other embodiments, a number of optical films may be adjusted to two or more according to application requirements of the backlight module.

In the embodiment, a projection profile of the first optical microstructure MS1 on a plane XZ and a projection profile of the second optical microstructure MS2 on a plane YZ are a triangle or a combination of two straight line segments, but the invention is not limited thereto. In other embodiments, cross-sectional profiles of the first optical microstructure MS1 and the second optical microstructure MS2 may also be a combination of a straight line segment and an arc line segment.

Further, referring to FIG. 1, the backlight module 10 may selectively further include a light absorbing sheet 180 disposed at one side of the bottom surface 100d of the light guide member 100. For example, most first light beams LB1 emitted from the first light source S1 are emitted from the light emitting surface 100c after being transmitted by the light guide member 100 and reflected by the first optical microstructure MS1, and aim at the first light emitting angle range. However, during transmission in the light guide member 100, a small portion of first light beams LB1 encounter unintended scattering due to a small defect on a surface and an interior of the light guide member 100 or are emitted from the bottom surface 100d of the light guide member 100 after being refracted or reflected by the first optical microstructure MS1. On this basis, an absorption rate of the light absorbing sheet 180 for a visible light band is greater than 80%, so that an impact of a stray light on the emitted-light type of the backlight module 10 can be effectively reduced, helping further improve light collecting performance of the backlight module 10 in the anti-peep mode (that is, when the first light source S1 is turned on). In an exemplary embodiment, the absorption rate of the light absorbing sheet 180 for the visible light band may be selectively greater than 90%.

Some other embodiments are listed below to describe the disclosure in detail. The same components are marked with a same symbol, and the descriptions of the same technical content are omitted. For the omitted parts, refer to the foregoing embodiments, and the descriptions thereof are omitted herein.

Figure 5:
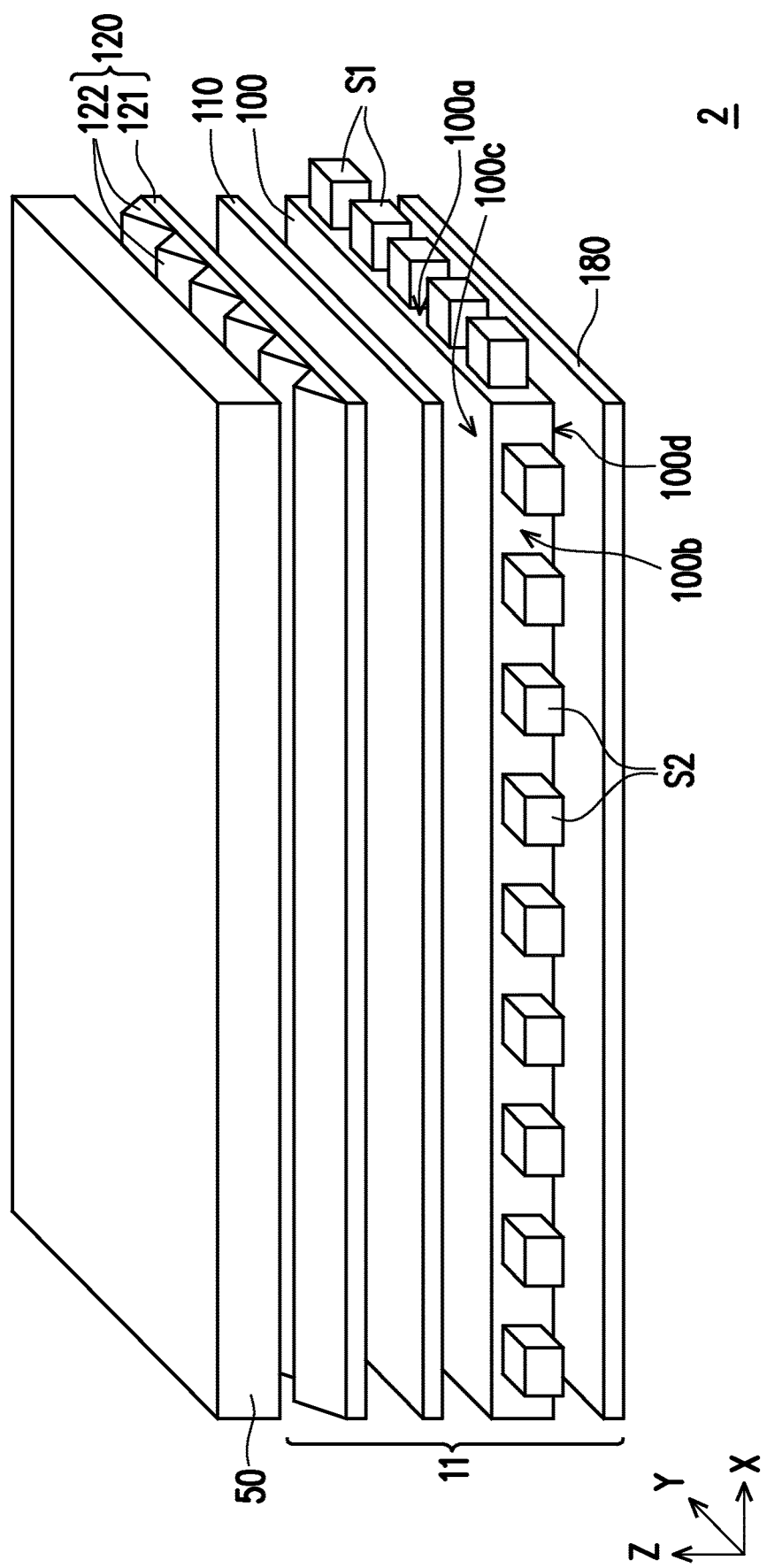
FIG. 5 is a schematic view of a display apparatus according to a second embodiment of the invention.
Figure 6:
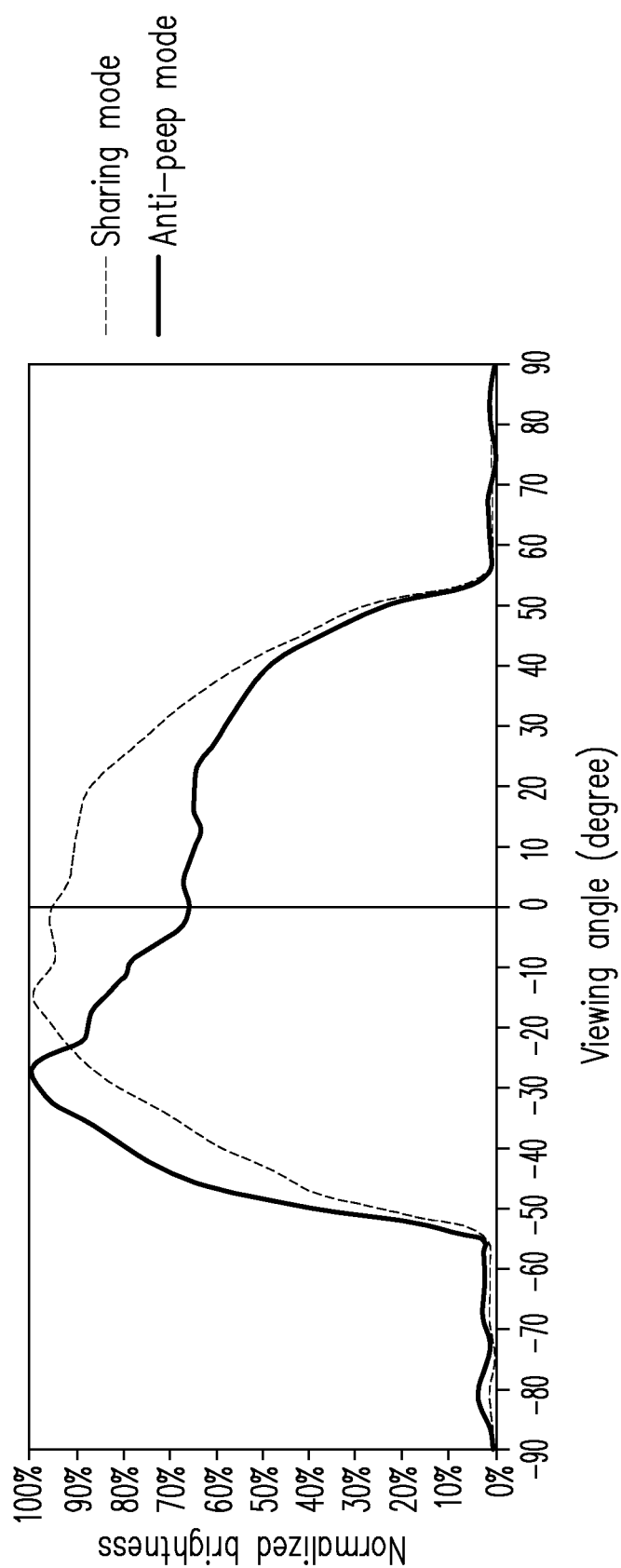
FIG. 6 is a graph of a viewing angle versus normalized brightness of a backlight module of FIG. 5 in different modes.

FIG. 5 is a schematic view of a display apparatus according to a second embodiment of the invention. FIG. 6 is a graph of a viewing angle versus normalized brightness of a backlight module of FIG. 5 in different modes. Referring to FIG. 5, a main difference between a display apparatus 2 in the embodiment and the display apparatus 1 in FIG. 1 lies in different optical film numbers. In the embodiment, a backlight module 11 of the display apparatus 2 further includes an optical film 120 disposed between an optical film 110 and a display panel 50. For example, the optical film 120 includes a substrate 121 and a plurality of prism structures 122. The prism structures 122 are arranged on a side surface of the substrate 121 away from a light guide member 100 in a direction Y. In other words, the optical film 120 in the embodiment may be a prism sheet, but the invention is not limited thereto.

It is worth noting that the prism pillar structures 122 extend in a direction perpendicular to a first light incident surface 100a of the light guide member 100. In the embodiment, the substrate 121 may be made of a material including polyethylene terephthalate (PET) and polycarbonate (PC). The prism structure 122 may be made of a material including UV glue or other suitable high-molecular polymers. Referring to FIG. 6, through the disposed prism sheet (that is, the optical film 120), a light emitting amount of the backlight module 11 in a wide viewing angle (for example, a range of 60 degrees or more) can be further reduced, helping improve light collecting performance of the backlight module 11.

Figure 7:
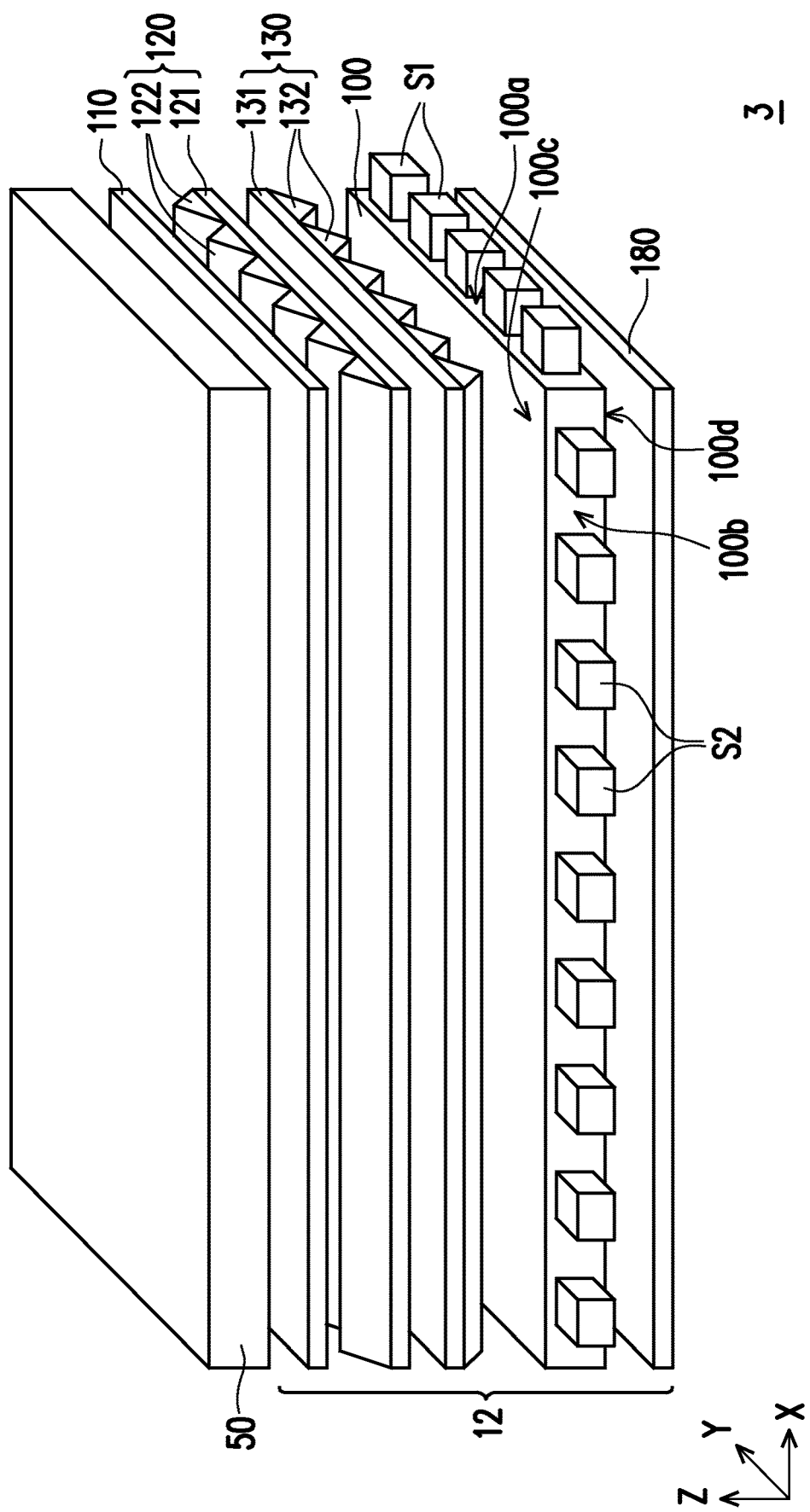
FIG. 7 is a schematic view of a display apparatus according to a third embodiment of the invention.
Figure 8:
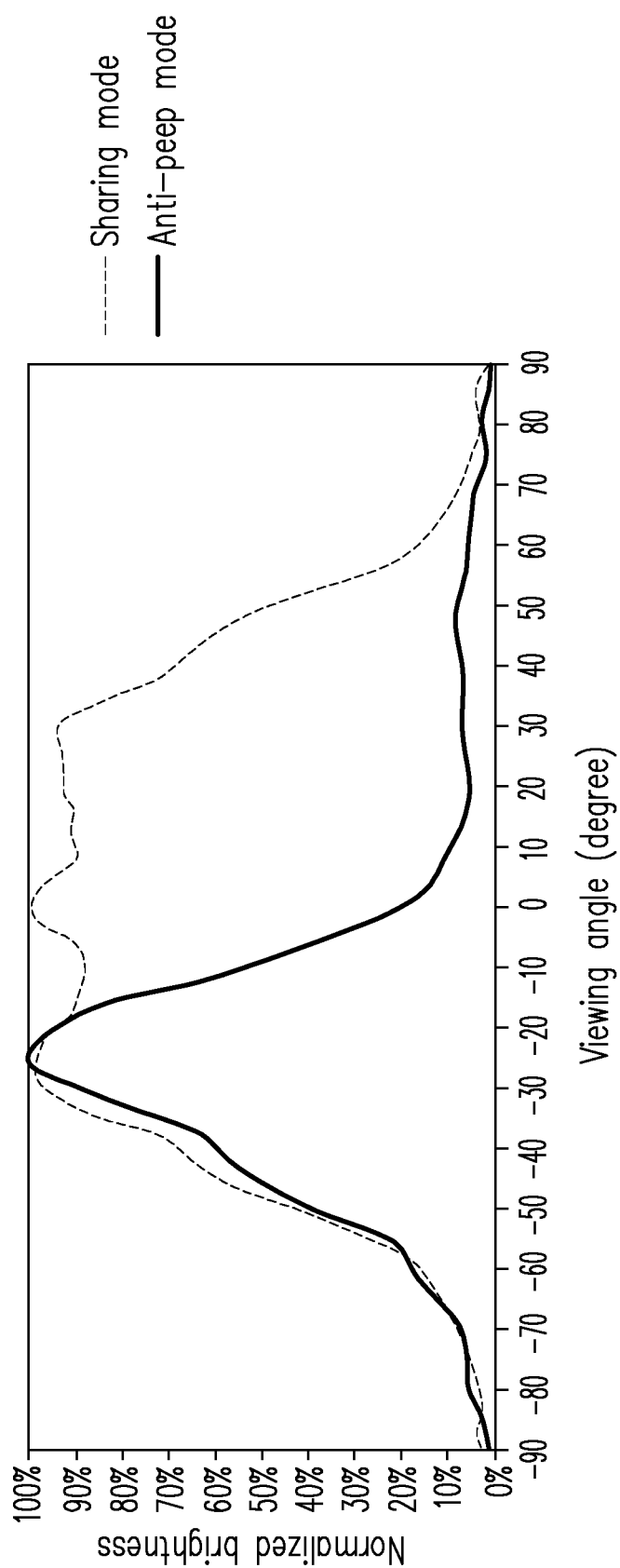
FIG. 8 is a graph of a viewing angle versus normalized brightness of a backlight module of FIG. 7 in different modes.

FIG. 7 is a schematic view of a display apparatus according to a third embodiment of the invention. FIG. 8 is a graph of a viewing angle versus normalized brightness of a backlight module of FIG. 7 in different modes. Referring to FIG. 7, a main difference between a display apparatus 3 in the embodiment and the display apparatus 2 in FIG. 5 lies in different optical film numbers. In particular, a backlight module 12 of the display apparatus 3 includes, in addition to an optical film 120, an optical film 130 disposed between a light guide member 100 and the optical film 120. In the embodiment, the optical film 110 may be selectively disposed between a display panel 50 and the optical film 120, but the invention is not limited thereto.

For example, the optical film 130 includes a substrate 131 and a plurality of prism structures 132. The prism structures 132 are arranged on a side surface of the substrate 131 closer to a light guide member 100 in a direction Y. The prism structures 132 extend in a direction perpendicular to a first light incident surface 100a of the light guide member 100. In other words, the optical film 130 in the embodiment may be an inverse prism sheet, but the invention is not limited thereto. In the embodiment, the substrate 131 may be made of a material including polyethylene terephthalate (PET) and polycarbonate (PC). The prism structure 132 may be made of a material including UV glue or other suitable high-molecular polymers.

In particular, referring to FIG. 7 and FIG. 8 together, in the embodiment, according to a configuration relationship between the optical films 120 and 130, overall light emitting amounts of the backlight module 12 near a normal viewing angle (for example, a viewing angle range of −10 degrees to 10 degrees) and in a rightward viewing angle range when the backlight module operates in an anti-peep mode (that is, a first light source S1 is turned on and a second light source S2 is turned off) can be further reduced, helping further improve an anti-peep effect of the display apparatus 3. However, the invention is not limited thereto. In another embodiment, a first angle α1 (shown in FIG. 3A) of a first optical microstructure MS1 (not shown) and a second angle α2 (shown in FIG. 3B) of a second optical microstructure MS2 (not shown) may be designed to be substantially equal. According to a configuration relationship between the optical films 120 and 130, the overall light emitting amounts of the backlight module 12 near the normal viewing angle and in the rightward viewing angle range when the backlight module operates in the anti-peep mode can be reduced, so that the display apparatus 3 has a one-side anti-peep effect.

Figure 9:
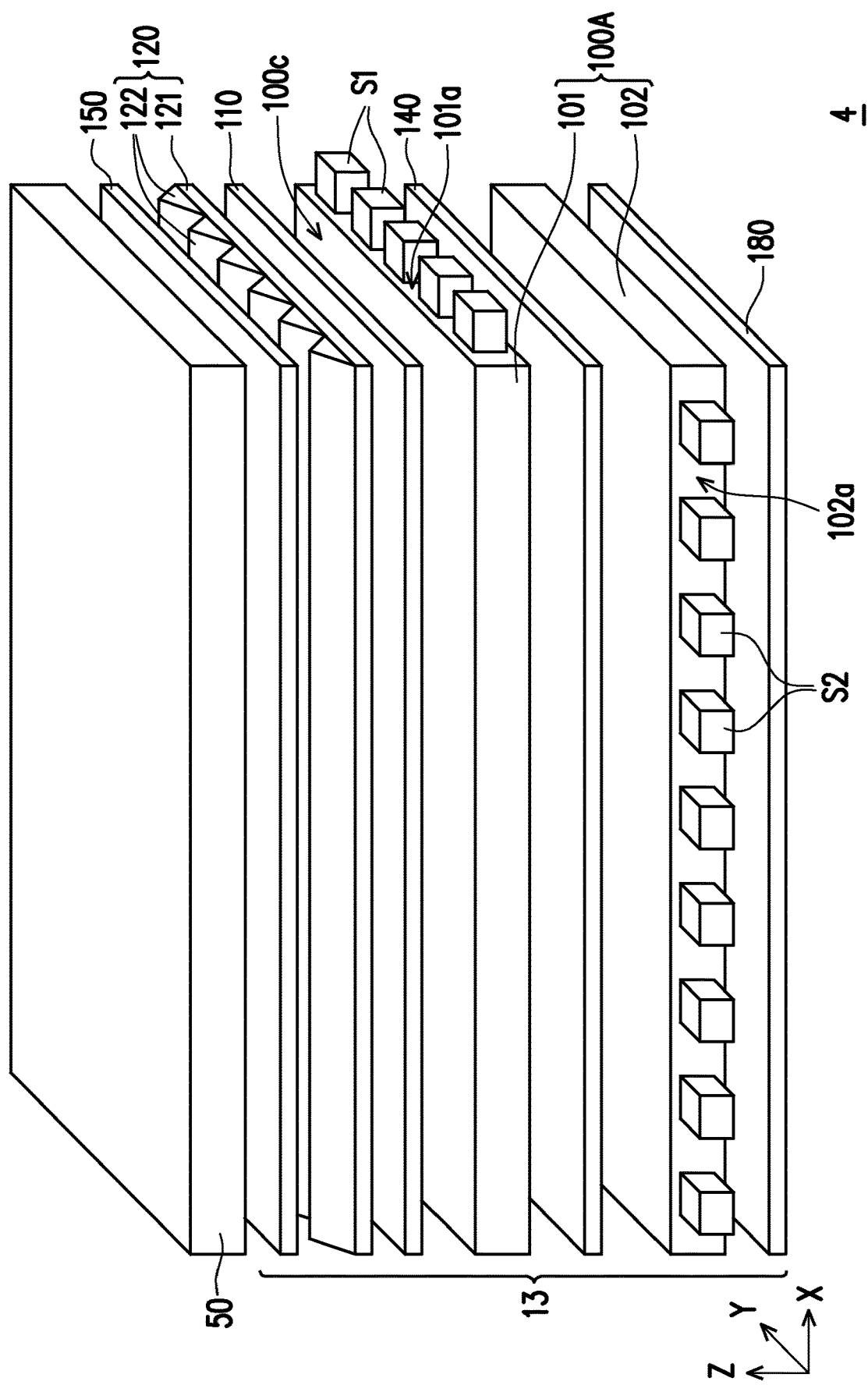
FIG. 9 is a schematic view of a display apparatus according to a fourth embodiment of the invention.
Figure 10A:
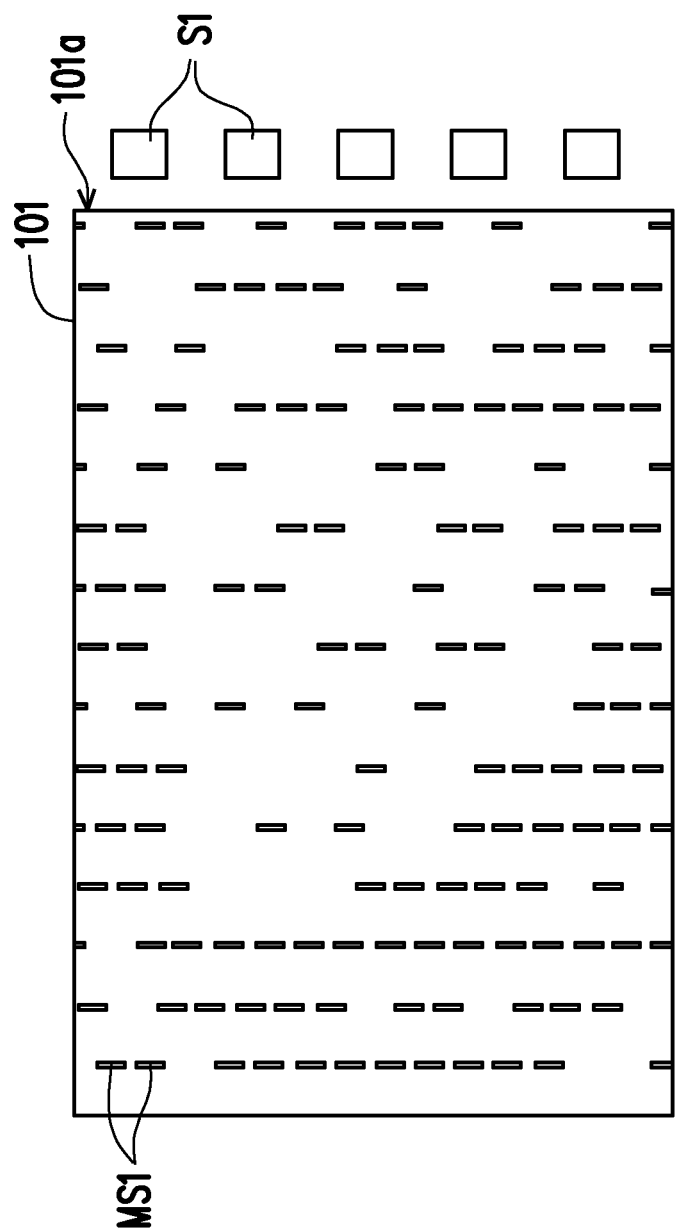
FIG. 10A is a schematic top view of a first light guide plate, a first optical microstructure, and a first light source in FIG. 9.
Figure 10B:
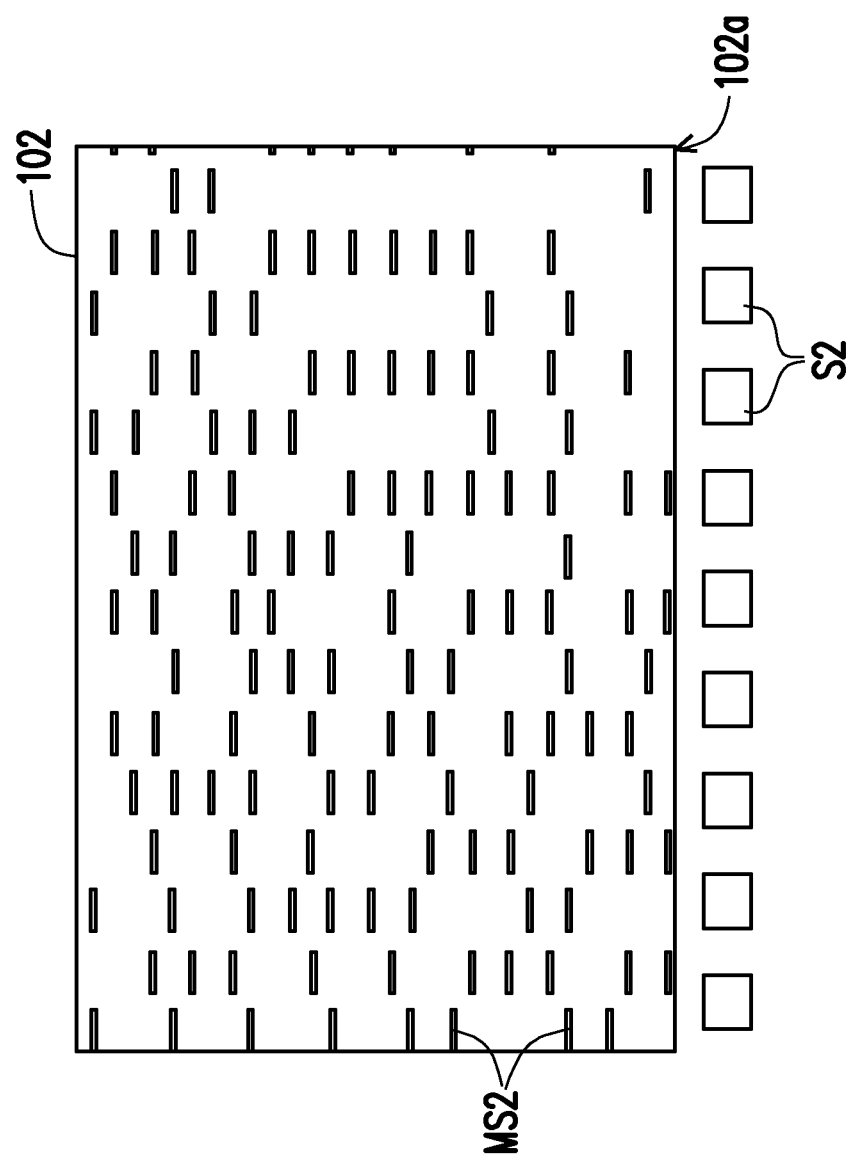
FIG. 10B is a schematic top view of a second light guide plate, a second optical microstructure, and a second light source in FIG. 9.
Figure 11:
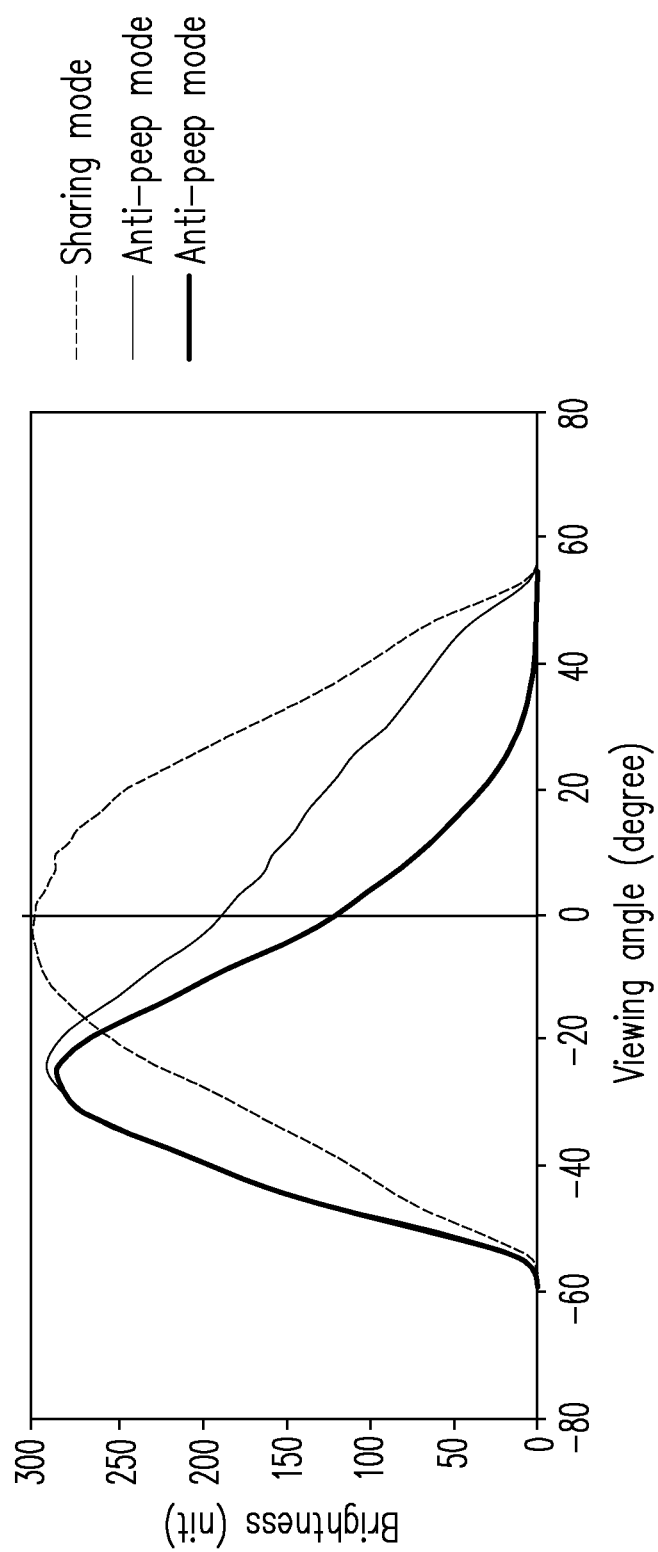
FIG. 11 is a graph of a viewing angle versus normalized brightness of a backlight module of FIG. 9 in different modes.

FIG. 9 is a schematic view of a display apparatus according to a fourth embodiment of the invention. FIG. 10A is a schematic top view of a first light guide plate, a first optical microstructure, and a first light source in FIG. 9. FIG. 10B is a schematic top view of a second light guide plate, a second optical microstructure, and a second light source in FIG. 9. FIG. 11 is a graph of a viewing angle versus brightness of a backlight module of FIG. 9 in different modes.

Referring to FIG. 9, FIG. 10A, and FIG. 10B, a main difference between a display apparatus 4 in the embodiment and the display apparatus 2 in FIG. 5 lies in different backlight module compositions, light guide member compositions, and optical films numbers. In the embodiment, a light guide member 100A is a combination of a first light guide plate 101 and a second light guide plate 102. The first light guide plate 101 is located between the second light guide plate 102 and a display panel 50. In particular, a first light incident surface 101a and a second light incident surface 102a of the light guide member 100A are provided on the first light guide plate 101 and the second light guide plate 102, respectively. A normal projection of the first light incident surface 101a and a normal projection of the second light incident surface 102a on a light emitting surface 100c of the light guide member 100A are adjacent to each other. Particularly, an arrangement relationship between the first light guide plate 101 and the second light guide plate 102 is not particularly limited in the invention. For example, in the embodiment, the first light guide plate 101 is disposed between the second light guide plate 102 and the display panel 50. However, in other embodiments, the second light guide plate 102 may be disposed between the first light guide plate 101 and the display panel 50.

In the embodiment, a first light source S1 of the backlight module 13 is disposed at one side of the first light incident surface 101a (or the first light guide plate 101) of the light guide member 100A, and a second light source S2 is disposed at one side of the second light incident surface 102a (or the second light guide plate 102) of the light guide member 100A. In addition, a first optical microstructure MS1 and a second optical microstructure MS2 are disposed at the first light guide plate 101 and the second light guide plate 102, respectively. Since a manner of configuring the optical microstructure on the light guide plate in the embodiment is similar to the implementations shown in FIG. 3A and FIG. 3B, for detailed description, refer to the relevant paragraphs in the foregoing embodiments, and the descriptions thereof are omitted herein.

It is worth noting that the first optical microstructure MS1 and the second optical microstructure MS2 are disposed on the first light guide plate 101 and the second light guide plate 102, respectively, so that a first light beam emitted from the first light source S1 can be prevented from generating an unexpected stray light as a result of being reflected by the second optical microstructure MS2, thereby helping improve an anti-peep effect of the display apparatus 4. In addition, the backlight module 13 in the embodiment may selectively include an optical film 140 disposed between the first light guide plate 101 and the second light guide plate 102. In the embodiment, the optical film 140 is, for example, a diffuser.

Further, the backlight module 13 further includes a viewing angle controller 150. The viewing angle controller 150 is overlapped with the light guide member 100A and is located between the display panel 50 and the optical film 120. However, the invention is not limited thereto. According to other embodiments, the viewing angle controller 150 may also be disposed at the display panel 50. In other words, the display panel 50 may also be located between the viewing angle controller 150 and the optical film 120.

In the embodiment, the viewing angle controller 150 may include a liquid crystal cell (not shown) and two polaroids (not shown) disposed at opposite sides of the liquid crystal cell. The liquid crystal cell includes a liquid crystal layer (not shown) and two electrode layers (not shown) located at opposite sides of the liquid crystal layer. The two electrode layers may be enabled to form an electric field between the two electrode layers. The electric field is configured to drive a plurality of liquid crystal molecules (not shown) of the liquid crystal layer to rotate. Accordingly, optical axes of the plurality of liquid crystal molecules may be changed according to different electric field sizes and distributions, so that light emitting amounts of the viewing angle controller at different viewing angles can be adjusted. In other words, the viewing angle controller 150 in the embodiment may be an electronically controlled viewing angle switcher, but the invention is not limited thereto. In other embodiments, the viewing angle controller 150 may be a fixed viewing angle controller (for example, light control film).

When the backlight module 13 operates in an anti-peep mode and the viewing angle controller 150 is turned on, a first light emitting angle range (for example, a viewing angle range of −37 degrees to −15 degrees) of the backlight module does not cover a normal viewing angle range (for example, a viewing angle range of −10 degrees to 10 degrees), which is shown by a thick solid line curve in FIG. 11. In other words, the display apparatus 4 currently has a favorable anti-peep effect. However, the invention is not limited thereto. When the backlight module 13 operates in the anti-peep mode but the viewing angle controller 150 is disabled, although the first light emitting angle range covers a part of the normal viewing angle range, the backlight module can still provide an effective anti-peep effect, which is shown by a thin solid line curve in FIG. 11. In other words, the display apparatus 4 can currently achieve both an anti-peep effect and energy conservation in different degrees of anti-peep modes at relatively low energy consumption. In addition, when the backlight module 13 operates in a sharing mode and the viewing angle controller 150 is disabled, a second light emitting angle range of the backlight module covers all of the normal viewing angle range (shown by a dashed line curve in FIG. 11) to meet a multi-user viewing requirement.

Figure 12:
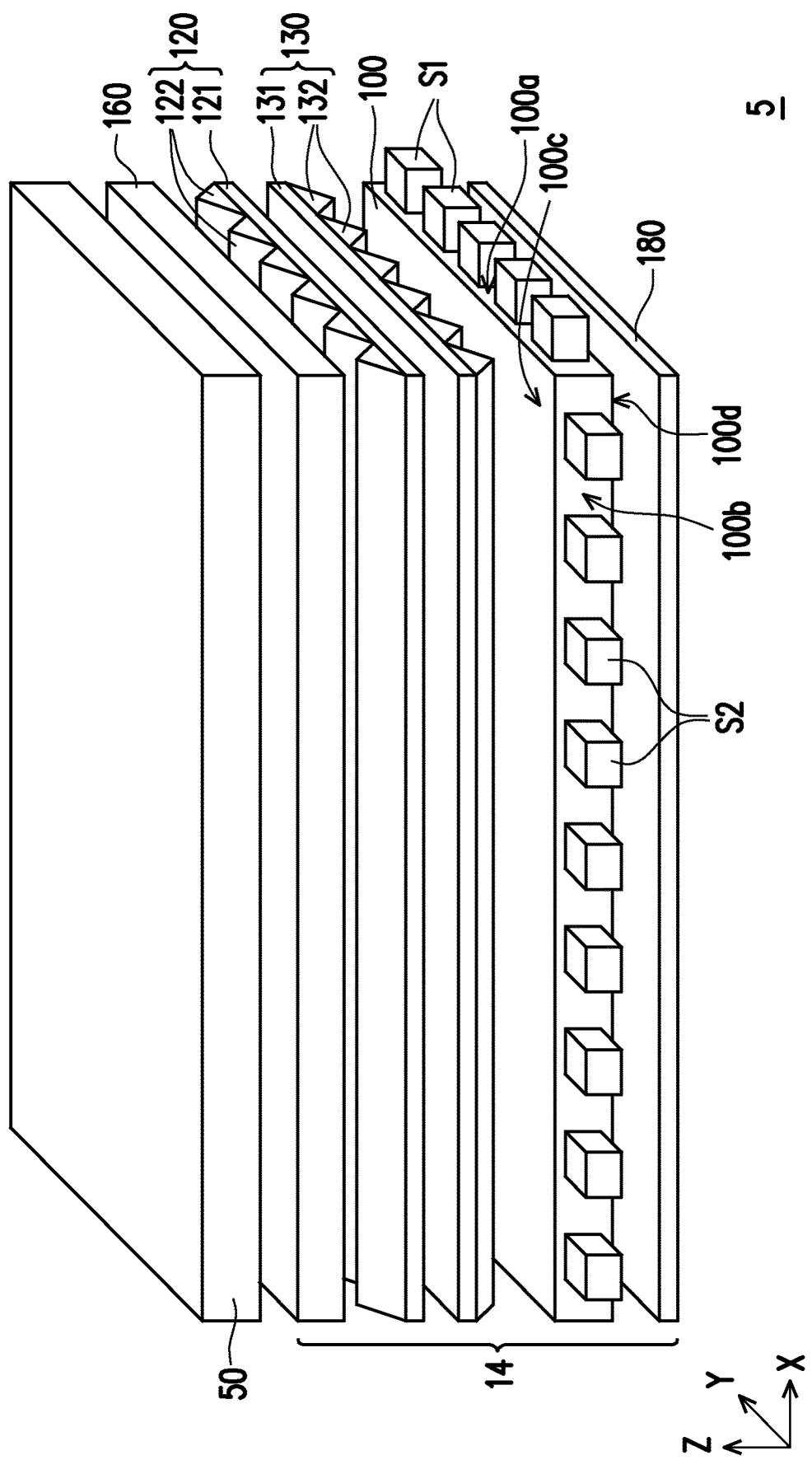
FIG. 12 is a schematic view of a display apparatus according to a fifth embodiment of the invention.

FIG. 12 is a schematic view of a display apparatus according to a fifth embodiment of the invention. Referring to FIG. 12, a main difference between a display apparatus 5 in the embodiment and the display apparatus 3 in FIG. 7 lies in different backlight module compositions and optical film numbers. In particular, a backlight module 14 of a display apparatus 5 further includes an electrically controlled diffusion film 160. The electrically controlled diffusion film 160 is disposed at a light guide member 100 and is located at one side of a light emitting surface 100c of the light guide member 100. More specifically, an optical film 120 and an optical film 130 are disposed between the light guide member 100 and the electrically controlled diffusion film 160.

In the embodiment, the electrically controlled diffusion film 160 is, for example, a polymer dispersed liquid crystal (PDLC) film, but the invention is not limited thereto. In other embodiments, the electrically controlled diffusion film 160 may also be a polymer network liquid crystal (PNLC) film, a liquid crystal lens (LC Lens), or other structures capable of changing a beam divergence through electrical control. For example, when being disabled, the electrically controlled diffusion film 160 can have an effect similar to an effect of a diffusion sheet, that is, can increase a light emitting angle, so that the display apparatus 5 may have a relatively large visible viewing angle range when operating in the sharing mode. On the contrary, when the display apparatus 5 operates in an anti-peep mode (that is, a second light source S2 is turned on and a first light source S1 is turned off), the electrically controlled diffusion film 160 is enabled to be transparent. In other words, after a light beam passes through the enabled electronically controlled diffusion film 160, an original light emitting angle of the light beam can be substantially maintained, so that the display apparatus 5 exhibits a favorable anti-peep effect.

In summary, in the backlight module and the display apparatus according to an embodiment of the invention, the first light source and the second light source are provided at two adjacent light incident sides of the light guide member, respectively. The first light beam emitted by the first light source and the second light beam emitted by the second light source have the first light emitting angle range and the second light emitting angle range respectively after being reflected by the first optical microstructure and the second optical microstructure on the light guide member. The first light emitting angle range is less than the second light emitting angle range. Through switch of on/off of the first light source and the second light source, the backlight module can have an adjustable emitted-light type. Therefore, the display apparatus can be switched between an anti-peep mode and a sharing mode, facilitating operation of the display apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module, comprising: a light guide member, a first light source, a second light source, a plurality of first optical microstructures, and a plurality of second optical microstructures, wherein the light guide member comprises a first light incident surface and a second light incident surface adjacent to each other;

the first light source is disposed at one side of the first light incident surface of the light guide member and is configured to generate a first light beam;

the second light source is disposed at one side of the second light incident surface of the light guide member and is configured to generate a second light beam;

the plurality of first optical microstructures are disposed at the light guide member, and each of the plurality of first optical microstructures comprises a first light receiving surface facing the first light source, wherein the plurality of first light receiving surfaces are configured to reflect the first light beam, the reflected first light beam comprises a first light emitting angle range, and the first light emitting angle range does not comprise a normal viewing angle range; and the plurality of second optical microstructures are disposed at the light guide member, and each of the plurality of second optical microstructures comprises a second light receiving surface facing the second light source, wherein the plurality of second light receiving surfaces are configured to reflect the second light beam, and the reflected second light beam comprises a second light emitting angle range, wherein the light guide member further comprises a bottom surface, wherein the first light incident surface and the second light incident surface are connected to two adjacent sides of the bottom surface, respectively, the first optical microstructure and the second optical microstructure are disposed on the bottom surface, a first angle is provided between the first light receiving surface and the bottom surface, and a second angle is provided between the second light receiving surface and the bottom surface, the first angle is greater than 10 degrees and less than 30 degrees, and the second angle is greater than 45 degrees and less than 60 degrees.

2. The backlight module according to claim 1, wherein the light guide member comprises a first light guide plate and a second light guide plate overlapped with each other, the plurality of first optical microstructures are disposed on the first light guide plate, and the plurality of second optical microstructures are disposed on the second light guide plate.

3. The backlight module according to claim 1, wherein each of the plurality of first optical microstructures further comprises a first shady surface facing away from the first light source, a third angle is provided between the first shady surface and the bottom surface, each of the plurality of second optical microstructures further comprises a second shady surface facing away from the second light source, and a fourth angle is provided between the second shady surface and the bottom surface, wherein the third angle is unequal to the fourth angle.

4. The backlight module according to claim 3, wherein the first angle of the first optical microstructure is less than the second angle of the second optical microstructure, and the first optical microstructure is less than the third angle.

5. The backlight module according to claim 1, wherein the backlight module is configured to switch between an anti-peep mode and a sharing mode, wherein, the first light source is turned on and the second light source is turned off when the backlight module is in the anti-peep mode, and, the second light source is turned on and the first light source is turned off when the backlight module is in the sharing mode.

6. The backlight module according to claim 1, further comprising:
at least one optical film disposed at the light guide member, wherein the at least one optical film comprises a plurality of prism structures, and the plurality of prism structures extend in a direction perpendicular to the first light incident surface.

7. The backlight module according to claim 1, further comprising:
an electrically controlled diffusion film disposed at one side of a light emitting surface of the light guide member, wherein the light emitting surface is opposite to the bottom surface and connects the first light incident surface and the second light incident surface; and
at least one optical film disposed between the light guide member and the electrically controlled diffusion film.

8. The backlight module according to claim 1, further comprising:
a viewing angle controller overlapped with the light guide member.

9. A backlight module, comprising: a light guide member, a first light source, a second light source, a plurality of first optical microstructures, and a plurality of second optical microstructures, wherein the light guide member comprises a first light incident surface and a second light incident surface adjacent to each other;

the first light source is disposed at one side of the first light incident surface of the light guide member and is configured to generate a first light beam;

the second light source is disposed at one side of the second light incident surface of the light guide member and is configured to generate a second light beam;

the plurality of first optical microstructures are disposed at the light guide member, and each of the plurality of first optical microstructures comprises a first light receiving surface facing the first light source, wherein the plurality of first light receiving surfaces are configured to reflect the first light beam, the reflected first light beam comprises a first light emitting angle range, and the first light emitting angle range does not comprise a normal viewing angle range;

the plurality of second optical microstructures are disposed at the light guide member, and each of the plurality of second optical microstructures comprises a second light receiving surface facing the second light source, wherein the plurality of second light receiving surfaces are configured to reflect the second light beam, and the reflected second light beam comprises a second light emitting angle range; and at least one optical film disposed at the light guide member, wherein the at least one optical film comprises a plurality of prism structures, and the plurality of prism structures extend in a direction perpendicular to the first light incident surface, wherein the at least one optical film comprises at least two optical films and comprises a prism sheet and an inverse prism sheet, the light guide member further comprises a bottom surface, the first light incident surface and the second light incident surface are connected to two adjacent sides of the bottom surface, respectively, the first optical microstructure and the second optical microstructure are disposed on the bottom surface, a first angle is provided between the first light receiving surface and the bottom surface, a second angle is provided between the second light receiving surface and the bottom surface, and the first angle is equal to the second angle.

10. A display apparatus, comprising a display panel and a backlight module, wherein
the backlight module is overlapped with the display panel and comprises a light guide member, a first light source, a second light source, a plurality of first optical microstructures, and a plurality of second optical microstructures, wherein the light guide member comprises a first light incident surface and a second light incident surface, the first light incident surface and the second light incident surface are adjacent to each other, the first light source is disposed at one side of the first light incident surface of the light guide member and is configured to generate a first light beam, the second light source is disposed at one side of the second light incident surface of the light guide member and is configured to generate a second light beam, the plurality of first optical microstructures are disposed at the light guide member, and each of the plurality of first optical microstructures comprises a first light receiving surface facing the first light source, wherein the plurality of first light receiving surfaces are configured to reflect the first light beam, the reflected first light beam comprises a first light emitting angle range, and the first light emitting angle range does not comprise a normal viewing angle range, and the plurality of second optical microstructures are disposed at the light guide member, and each of the plurality of second optical microstructures comprises a second light receiving surface facing the second light source, wherein the plurality of second light receiving surfaces are configured to reflect the second light beam, and the reflected second light beam comprises a second light emitting angle range, wherein the light guide member further comprises a bottom surface, wherein the first light incident surface and the second light incident surface are connected to two adjacent sides of the bottom surface, respectively, the first optical microstructure and the second optical microstructure are disposed on the bottom surface, a first angle is provided between the first light receiving surface and the bottom surface, and a second angle is provided between the second light receiving surface and the bottom surface, the first angle is greater than 10 degrees and less than 30 degrees, and the second angle is greater than 45 degrees and less than 60 degrees.

* * * * *